US008283609B2

(12) United States Patent
Jeong (10) Patent No.: US 8,283,609 B2
(45) Date of Patent: Oct. 9, 2012

(54) ON DIE THERMAL SENSOR IN SEMICONDUCTOR MEMORY DEVICE

(75) Inventor: Chun-Seok Jeong, Kyoungki-do (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 1502 days.

(21) Appl. No.: 11/819,944

(22) Filed: Jun. 29, 2007

(65) Prior Publication Data

US 2008/0106322 A1    May 8, 2008

(30) Foreign Application Priority Data

Nov. 2, 2006  (KR) .......................... 10-2006-0107891

(51) Int. Cl.
 *H05B 1/02*  (2006.01)
(52) U.S. Cl. ......... 219/512; 219/497; 219/499; 219/501
(58) Field of Classification Search .................. 219/497, 219/121.43, 209, 210; 327/512, 539; 702/130
 See application file for complete search history.

(56) References Cited

U.S. PATENT DOCUMENTS

| 6,531,911 | B1 | 3/2003 | Hsu et al. |
| 6,876,250 | B2 | 4/2005 | Hsu et al. |
| 7,138,823 | B2 | 11/2006 | Janzen et al. |
| 7,570,107 | B2 * | 8/2009 | Kim et al. ..................... 327/539 |
| 2006/0111865 | A1 | 5/2006 | Choi |
| 2006/0158214 | A1 | 7/2006 | Janzen et al. |
| 2007/0040574 | A1 | 2/2007 | Janzen et al. |
| 2008/0042737 | A1 * | 2/2008 | Kim et al. ..................... 327/539 |
| 2009/0059701 | A1 * | 3/2009 | Byeon ........................... 365/205 |

FOREIGN PATENT DOCUMENTS

| JP | 10-255467 | 9/1998 |
| KR | 1999-0048860 | 7/1999 |
| KR | 2003-0079425 | 10/2003 |
| KR | 10-2005-0082585 | 8/2005 |
| KR | 10-2006-0104899 | 10/2006 |

OTHER PUBLICATIONS

Notice of Allowance issued in Korean Patent Application No. KR 10-2006-0107891, mailed Jan. 30, 2008.

* cited by examiner

*Primary Examiner* — Mark Paschall
(74) *Attorney, Agent, or Firm* — IP & T Group LLP (57) ABSTRACT

An on die thermal sensor in a semiconductor memory device includes: a reference voltage generating unit for generating a band gap voltage and generating a reference voltage by using the base band gap voltage; a voltage amplifying unit for outputting a temperature voltage by amplifying the band gap voltage; and a temperature information code generating unit for generating a temperature information code corresponding to a voltage level of the temperature voltage, wherein voltage variation of the temperature voltage is amplified as much as a preset amplifying value and a maximum voltage level of the temperature voltage is maintained lower than that of a power supply voltage used in the semiconductor memory device.

21 Claims, 4 Drawing Sheets

ON DIE THERMAL SENSOR IN SEMICONDUCTOR MEMORY DEVICE

CROSS-REFERENCE TO RELATED APPLICATIONS

The present invention claims priority of Korean patent application number 10-2006-0107891, filed on Nov. 2, 2006, which is incorporated by reference in its entirety.

BACKGROUND OF THE INVENTION

The present invention relates to an on die thermal sensor (ODTS) in a semiconductor memory device, and more particularly, to an ODTS capable of maintaining temperature sensitivity by not lowering voltage variation of a temperature voltage with respect to temperature variation under low power supply voltage circumstances.

A dynamic random access memory (DRAM) cell includes a transistor for operating as a switch and a capacitor for storing a charge, i.e., data. According to whether the capacitor stores the charge, i.e., whether a terminal voltage of the capacitor is high or low, a logic level of the data is determined as a high level or a low level.

Since the data is stored in the capacitor as an accumulated electrical charge form, there is no power consumption for the data storage ideally. However, since there occurs a leak current due to a PN junction of a metal oxide semiconductor (MOS) transistor, the stored initial charge may be discharged and, thus, the data may vanish.

To prevent data loss, the data stored in a memory cell is read and the read data is restored the memory cell by recharging the memory cell with a normal charge before the data vanishes. This operation should be periodically performed in order to maintain data.

The above-mentioned recharging operation is called a refresh operation and, generally, a control of the refresh operation is performed by a DRAM controller. Due to the refresh operation, refresh power is consumed. In case of a battery operated system which requires lower power consumption, reducing power consumption is very important and is a critical issue.

One method of reducing the power consumption for the refresh operation is changing a refresh period according to temperature. As the temperature decreases, a data holding time of the DRAM becomes longer. Therefore, by dividing a temperature range into several temperature regions and by lowering a frequency of a refresh clock at a relative low temperature region, power consumption is reduced.

Accordingly, a device for correctly sensing the temperature of the inside of the DRAM and for adjusting the refresh clock frequency is required.

As a semiconductor unit is highly integrated and operates at a high speed, a significant amount of heat is generated. The generated heat increases internal temperature of the semiconductor unit and, thus, can prevent the semiconductor unit from normally operating. The generated heat may cause a defect in the semiconductor unit.

Therefore, a device for correctly sensing the temperature of the semiconductor unit and for outputting the sensed temperature information is needed.

SUMMARY OF THE INVENTION

Embodiments of the present invention are directed to an on die thermal sensor (ODTS) capable of maintaining temperature sensitivity by not lowering voltage variation of a temperature voltage with respect to temperature variation under low power supply voltage circumstances.

In accordance with an aspect of the present invention, there is provided an on die thermal sensor (ODTS) in a semiconductor memory device, including: a reference voltage generating unit for generating a band gap voltage and generating a reference voltage by using the band gap voltage; a voltage amplifying unit for outputting a temperature voltage by amplifying the band gap voltage on the basis of the reference voltage; and a temperature information code generating unit for generating a temperature information code corresponding to a voltage level of the temperature voltage, wherein voltage variation of the temperature voltage is amplified as much as a preset amplifying value and a maximum voltage level of the temperature voltage is maintained lower than that of a power supply voltage used in the semiconductor memory device.

In accordance with another aspect of the present invention, there is provided an ODTS in a semiconductor memory device, including: a temperature information output unit for outputting a temperature voltage by measuring an internal temperature of the semiconductor memory device, wherein voltage variation of the temperature voltage is amplified as much as a preset amplifying value and a maximum voltage level of the temperature voltage is maintained lower than that of a power supply voltage used in the semiconductor memory device.

DESCRIPTION OF SPECIFIC EMBODIMENTS

It is an object of the present invention to provide an on die thermal sensor (ODTS) in a semiconductor memory device, for maintaining temperature sensitivity by not lowering voltage variation of a temperature voltage with respect to temperature variation of the semiconductor memory device under low power supply voltage circumstances. In the present invention, when the temperature voltage is generated by amplifying a band gap voltage with a preset amplifying value, voltage variation of the temperature voltage is amplified with the preset amplifying value and a maximum voltage level of the temperature voltage maintains a voltage level lower than a power supply voltage used in the semiconductor memory device.

Hereinafter, the ODTS in accordance with the present invention will be described in detail referring to the accompanying drawings.

Figure 1:
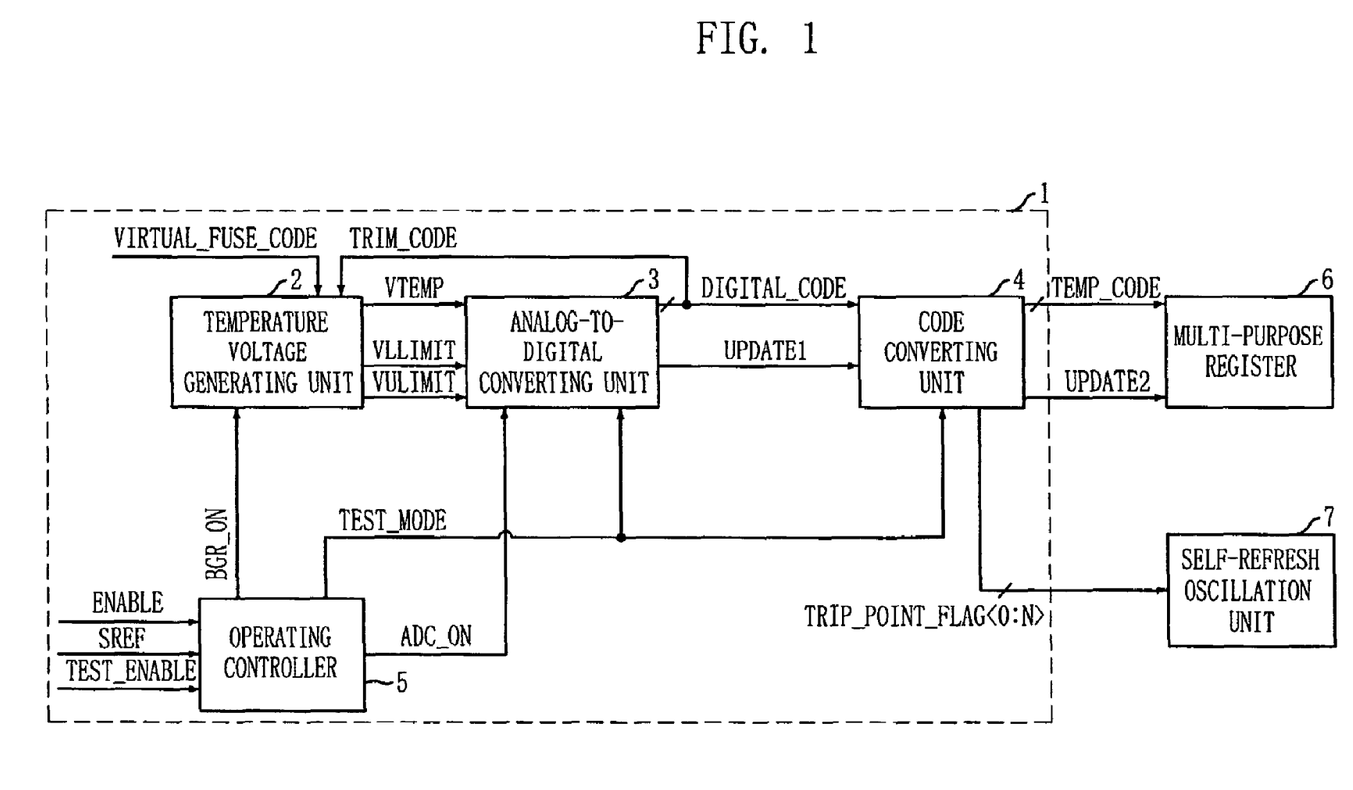
FIG. 1 is a block diagram of an on die thermal sensor (ODTS) for use in a semiconductor memory device.

FIG. 1 is a block diagram of an on die thermal sensor (ODTS) for use in a semiconductor memory device.

The ODTS 1 includes a temperature voltage generating unit 2, an analog-to-digital converting unit 3, a code converting unit 4, and an operation controller 5.

The temperature voltage generating unit 2 detects an internal temperature of the semiconductor memory device and generates a temperature voltage VTEMP according to the detected internal temperature. Further, the temperature voltage generating unit 2 outputs maximum and minimum variation voltages VULIMIT and VLLIMIT. The maximum and minimum variation voltages VULIMIT and VLLIMIT are generated from a band gap circuit provided in the temperature voltage generating unit 2 and keep a constant voltage level in spite of a variation of process, voltage and temperature (PVT). A user can set voltage levels of the maximum and minimum variation voltages VULIMIT and VLLIMIT in response to a virtual fuse code VIRTUAL_FUSE_CODE and an adjusting code TRIM_CODE.

The analog-to-digital converting unit 3 converts the temperature voltage VTEMP into a digital code DIGITAL_CODE having a digital value, and outputs a first update signal UPDATE1 for informing an update of the digital code DIGITAL_CODE when the digital code DIGITAL_CODE is updated according to the internal temperature of the semiconductor memory device. Herein, a voltage level of the digital code DIGITAL_CODE is adjusted between the maximum variation voltage VULIMIT and the minimum variation voltage VLLIMIT. The digital code DIGITAL_CODE is inputted to the temperature voltage generating unit 2 as the adjusting code TRIM_CODE to thereby adjust the digital code DIGITAL_CODE between the maximum variation voltage VULIMIT and the minimum variation voltage VLLIMIT.

The code converting unit 4 converts the digital code DIGITAL_CODE into a temperature information code TEMP_CODE and a plurality of flag signals TRIP_POINT_FLAG<0:N>, N being a positive integer, to output them with a second update signal UPDATE2 for informing an update of the temperature information code TEMP_CODE when the temperature information code TEMP_CODE is updated according to the internal temperature of the semiconductor memory device.

The operation controller 5 controls a normal mode operation of the ODTS 1 based on an enable signal ENABLE, controls an operation on a self-refresh mode operation of the ODTS 1 based on a self-refresh signal SREF, and controls an operation on a test mode of the ODTS 1 based on a test enable signal TEST_ENABLE. In detail, the operation controller 5 controls an operation of the temperature voltage generating unit 2 by generating a first operating control signal BGR_ON, controls an operation of the analog-to-digital converting unit 3 by generating a second operating control signal ADC_ON, and controls an operation of the ODTS 1 by generating a test mode signal TEST_MODE for controlling the test mode operation.

A multi-purpose register 6 located at the outside of the ODTS 1 stores the temperature information code TEMP_CODE in response to the second update signal UPDATE2. The stored temperature information code TEMP_CODE is outputted to the outside through a data output pad (DQ_PAD) or a memory controller can change a refresh period of the semiconductor memory device by reading the temperature information code TEMP_CODE stored in the multi-purpose register 6.

A self-refresh oscillation unit 7 located at the outside of the ODTS 1 operates in the self-refresh mode and changes a self-refresh period of the semiconductor memory device in response to the plurality of flag signals TRIP_POINT_FLAG<0:N>.

Figure 2:
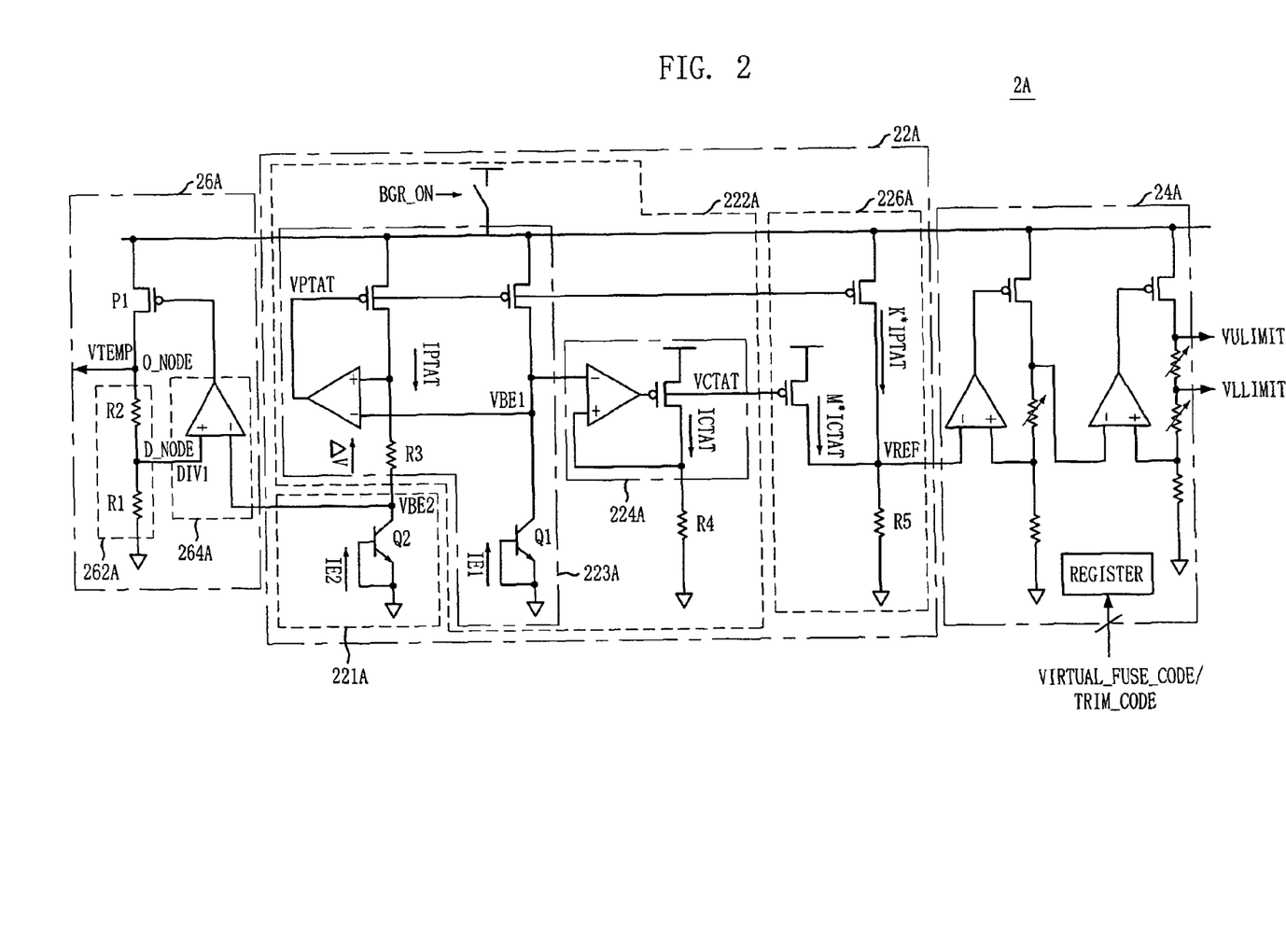
FIG. 2 is a detailed block diagram of a temperature voltage generating unit of the ODTS shown in FIG. 1 in accordance with a first embodiment of the present invention.

FIG. 2 is a detailed block diagram of the temperature voltage generating unit of the ODTS shown in FIG. 1 in accordance with a first embodiment of the present invention.

The temperature voltage generating unit 2A in accordance with the first embodiment of the present invention includes a reference voltage generating unit 22A, a voltage amplifying unit 26A, and a variation voltage generating unit 24A.

The reference voltage generating unit 22A generates a base-emitter voltage VBE2 of a second bipolar junction transistor (BJT) Q2 and a reference voltage VREF by using the base-emitter voltage VBE2 of the second BJT Q2. Herein, a voltage level of the base-emitter voltage VBE2 varies according to temperature variation, and a voltage level of the reference voltage VREF maintains a predetermined value regardless of the temperature variation. The voltage amplifying unit 26A outputs the temperature voltage VTEMP by amplifying the base-emitter voltage VBE2 of the second BJT Q2. The variation voltage generating unit 24A generates the maximum and minimum variation voltages VULIMIT and VLLIMIT by adjusting the reference voltage VREF in response to the virtual fuse code VIRTUAL_FUSE_CODE and the adjusting code TRIM_CODE, thereby adjusting the digital code DIGITAL_CODE between the maximum variation voltage VULIMIT and the minimum variation voltage VLLIMIT. Hereinafter, the base-emitter voltage VBE2 of the second BJT Q2 is referred to as a band gap voltage VBE2 for the sake of convenience.

In detail, the voltage amplifying unit 26A includes a differential amplifier 264A, a driver P1, and a divider 262A.

The differential amplifier 264A receives the band gap voltage VBE2 as a negative input (−) and a dividing voltage DIV1 as a positive input (+) to amplify and output the inputs. The driver P1 drives the temperature voltage VTEMP in response to an output of the differential amplifier 264A. The divider 262A divides a voltage level of the temperature voltage VTEMP by a preset value to thereby determine a voltage level of the dividing voltage DIV1.

The driver P1 includes a first PMOS transistor for driving a power supply voltage VDD coupled to its source to its drain as the temperature voltage VTEMP in response to the output of the differential amplifier 264A coupled to its gate.

The divider 262A includes first and second resistors R1 and R2, each having a preset resistance, between a temperature voltage output node O_NODE and a ground voltage VSS. The dividing voltage DIV1 is outputted to a common node D_NODE of the first and second resistors R1 and R2.

The reference voltage generating unit 22A includes a band gap voltage output unit 221A, a current generating unit 222A, and a reference voltage output unit 226A.

The band gap voltage output unit 221A outputs the band gap voltage VBE2 which is proportional to an emitter current IE2 of the second BJT Q2 and decreases as the internal temperature increases. The current generating unit 222A generates a first current IPTAT which increases as the internal temperature increases and a second current ICTAT which decreases as the internal temperature increases. The reference voltage output unit 226A outputs the reference voltage VREF in proportion to a third current generated by summing M times of the first current (M*IPTAT) and K times of the second current (K*ICTAT), i.e., M*IPTAT+K*ICTAT, M and K being an integers.

In detail, the current generating unit 222A includes a first current generating unit 223A and a second current generating unit 224A.

The first current generating unit 223A generates the first current IPTAT by providing a third resistor R3 having a preset resistance with the band gap voltage VBE2 proportional to the emitter current IE2 of the second BJT Q2. The second current generating unit 224A forms a cascade connection with the first current generating unit 223A and generates the second current ICTAT by providing a fourth resistor R4 having a preset resistance with a base-emitter voltage VBE1 of a first BJT Q1 proportional to an emitter current IE1 of the first BJT Q1. Herein, the emitter current IE2 of the second BJT Q2 has J times of the emitter current IE1 of the first BJT Q1.

The reference voltage output unit 226A generates the reference voltage VREF by providing a fifth resistor R5 having a preset resistance with the third current (M*IPTAT+ K*ICTAT)

Hereinafter, an operation of generating the temperature voltage VTEMP in the temperature voltage generating unit 2A is explained in detail.

The ODTS 1 detects the internal temperature of the semiconductor memory device base on the fact that the voltage level of the band gap voltage VBE2 changes according to the temperature variation in the ratio of about −1.8 mV/° C. The ODTS requires an amplifying circuit for amplifying the voltage level of the band gap voltage VBE2 with a preset amplifying value because the ratio of about −1.8 mV/° C. is fine variation. Accordingly, the temperature voltage generating unit 2A includes the voltage amplifying unit 26A for amplifying the band gap voltage VBE2 with the preset amplifying value to output the temperature voltage VTEMP.

At this time, voltage variation of the temperature voltage VTEMP is also amplified with the preset amplifying value, and thus the temperature voltage VTEMP has relatively large voltage variation in comparison with the band gap voltage VBE2. The differential amplifier 264A receives the band gap voltage VBE2 and the dividing voltage DIV1 to amplify the inputted voltages with the preset amplifying value and output according to an Equation 1.

$$VTEMP = \left(1 + \frac{R2}{R1}\right) \times VBE2 \qquad \text{[Equation 1]}$$

Referring to Equation. 1, to make the voltage variation of the temperature voltage VTEMP larger, a ratio of the second resistor R2 to the first resistor R1 should be larger. However, the voltage level of the temperature voltage VTEMP becomes also larger as the ratio of the second resistor R2 to the first resistor R1 becomes larger.

For example, if the voltage level of the band gap voltage VBE2 varies from 0.4V to 0.6V, the voltage level of the temperature voltage VTEMP varies from 0.6V to 0.9V when the voltage level of the temperature voltage VTEMP is amplified with 1.5 times. In the same manner, if the voltage level of the temperature voltage VTEMP is amplified with 2.5 times, the voltage level of the temperature voltage VTEMP varies from 1.0V to 1.5V.

As described above, voltage variation of the band gap voltage VBE2 is 0.3V when the preset amplifying value is 1.5; and 0.5V when the preset amplifying value is 2.5. That is, the voltage level of the temperature voltage VTEMP becomes larger as the preset amplifying value becomes larger, and the voltage variation of the temperature voltage VTEMP becomes also larger in proportion to the preset amplifying value.

Because the ODTS uses a power supply voltage substantially the same as that of the semiconductor memory device, the power supply voltage of the ODTS decreases as the power supply voltage of the semiconductor memory device decreases. If the power supply voltage of the ODTS decreases, it is restricted to set the preset amplifying value when the voltage amplifying unit 26A of the temperature voltage generating unit 2A amplifies the band gap voltage VBE2 with the preset amplifying value. This is because a maximum voltage level of the temperature voltage VTEMP cannot exceed the power supply voltage even if the voltage amplifying unit 26A amplifies the band gap voltage VBE2 with a great value. Accordingly, the ODTS can normally operate when the voltage amplifying unit 26A amplifies the band gap voltage VBE2 within the range that the maximum voltage level of the temperature voltage VTEMP cannot exceed the power supply voltage.

For example, a 3.3V power supply voltage is used in a single data rate (SDR) DRAM; a 2.5V power supply voltage is used in a double data rate (DDR) DRAM; a 1.8V power supply voltage is used in a double data rate II (DDR2) DRAM; and a 1.5V power supply voltage is used in a double data rate III (DDR3) DRAM. At each case, the ODTS used substantially the same power supply voltage as that of the each DRAM. When the voltage amplifying unit 26A of the temperature voltage generating unit 2A amplifies the band gap voltage VBE2 with the preset amplifying value, the preset amplifying value decreases according as the power supply voltage decreases.

At this time, the temperature voltage VTEMP generated by amplifying the band gap voltage VBE2 with the preset amplifying value has relatively large voltage variation as the preset amplifying value increases, and thus, the voltage variation of the temperature voltage VTEMP also decreases accordingly as the preset amplifying value decreases. As a result, the ODTS can abnormally operate as the voltage variation of the temperature voltage VTEMP decreases.

Namely, the ODTS detects the internal temperature of the semiconductor memory device within predetermined limits, a temperature sensitivity of the ODTS becomes lower as the power supply voltage of the ODTS decreases. As a result, a probability for erroneously measuring the internal temperature increases.

When the ODTS detects the internal temperature within a range of about 100° C., the maximum voltage level of the temperature voltage VTEMP becomes lower as the power supply voltage of the ODTS decreases. Accordingly, the voltage variation of the temperature voltage VTEMP becomes smaller when the internal temperature varies about 1° C.

The voltage level of the temperature voltage VTEMP varies owing to other factors, e.g., noise, unstable power supply voltage even if the internal temperature of the semiconductor memory device does not fluctuate. In this time, a probability for erroneously measuring the internal temperature also increases.

Figure 3:
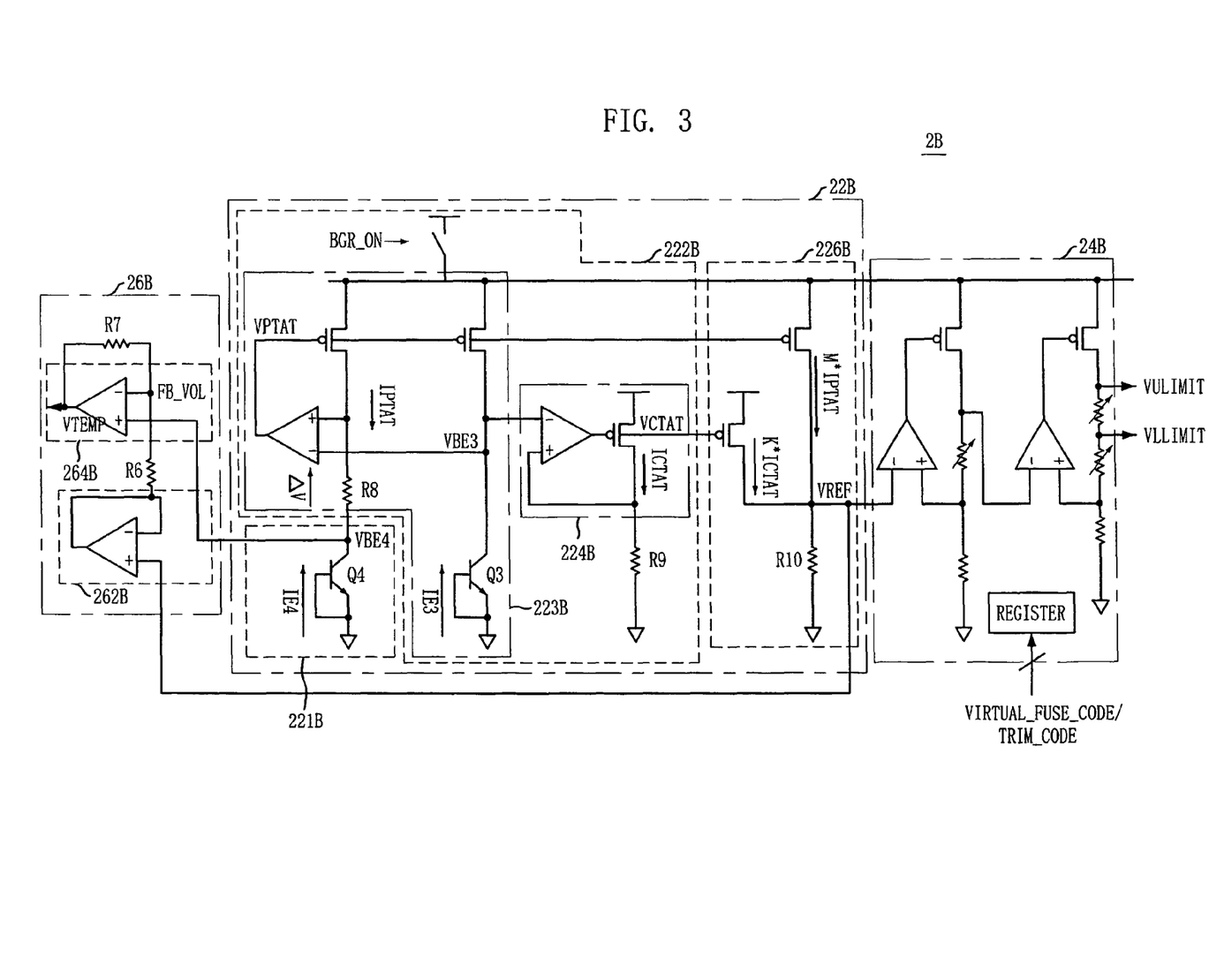
FIG. 3 is a detailed block diagram of a temperature voltage generating unit of the ODTS shown in FIG. 1 in accordance with a second embodiment of the present invention.

FIG. 3 is a detailed block diagram of the temperature voltage generating unit of the ODTS shown in FIG. 1 in accordance with a second embodiment of the present invention.

As shown, a temperature voltage generating unit 2B in accordance with the second embodiment of the present invention includes a reference voltage generating unit 22B, a voltage amplifying unit 26B, and a variation voltage generating unit 24B.

The reference voltage generating unit 22B generates a base-emitter voltage VBE4 of a second bipolar junction transistor (BJT) Q4 and a reference voltage VREF by using the base base-emitter voltage VBE4 of the second BJT Q4. Herein, a voltage level of the base-emitter voltage VBE4 varies according to temperature variation, and a voltage level of the reference voltage VREF maintains a predetermined value regardless of the temperature variation. The voltage amplifying unit 26B outputs the temperature voltage VTEMP by amplifying the base-emitter voltage VBE4. The variation voltage generating unit 24B generates maximum and minimum variation voltages VULIMIT and VLLIMIT by adjusting the reference voltage VREF in response to a virtual fuse code VIRTUAL_FUSE_CODE and an adjusting code TRIM_CODE, thereby adjusting a digital code DIGITAL_CODE between the maximum variation voltage VULIMIT and the minimum variation voltage VLLIMIT. Hereinafter, the base-emitter voltage VBE4 of the second BJT Q2 is referred to as a band gap voltage VBE4 for the sake of convenience.

In detail, the voltage amplifying unit 26B includes a reference voltage transferring unit 262B, a feedback unit and a band gap voltage amplifying unit 264B.

The reference voltage transferring unit 262B transfers the reference voltage VREF to the feedback unit. The feedback unit divides the temperature voltage VTEMP on the basis of an output of the temperature voltage transferring unit 262B to output a feedback voltage FB_VOL to the band gap voltage amplifying unit 264B. The band gap voltage amplifying unit 264B amplifies the band gap voltage VBE4 based on the feedback voltage FB_VOL.

For the reference, the temperature voltage generating unit 2B in accordance with the embodiment of the present invention is included in the ODTS 1 shown in FIG. 1, for outputting a temperature information code TEMP_CODE corresponding to the voltage temperature VTEMP.

In detail, the reference voltage transferring unit 262B includes a unit-gain buffer for amplifying the inputted reference voltage VREF by one-fold. Accordingly, the reference voltage VREF is not directly connected to the feedback unit or the band gap voltage amplifying unit 264B so that the voltage level of the reference voltage VREF is not affected with the voltage variation of the temperature voltage VTEMP.

The feedback unit includes first and second resistors R6 and R7, and the feedback voltage FB_VOL is outputted to a common node of the first and second resistors R6 and R7. That is, the feedback voltage FB_VOL is generated by dividing the temperature voltage VTEMP on the basis of the output of the reference voltage transferring unit 262B, i.e., the reference voltage VREF, in a ratio of the second resistor R7 to the first resistor R6. A user can set sizes of the first and second resistors R6 and R7.

The band gap voltage amplifying unit 264B includes an operational amplifier (OP AMP) for receiving the feedback voltage FB_VOL as a negative input (−) and the band gap voltage VBE4 as a positive input (+) to amplify the inputs with the preset amplifying value.

If the buffer of the reference voltage transferring unit 262B has a unit-gain and the OP AMP of the band gap voltage amplifying unit 264B has an infinite gain, an Equation. 2 is established as follows.

$$FB\_VOL = VBE4 \qquad \text{[Equation. 2]}$$

Because two input currents of the OP AMP are substantially the same, a first current I6 flowing the first resistor R6 is substantially the same as a second current I7 flowing the second resistor R7. Accordingly, an Equation. 3 is established as follows.

$$I6 = I7 = \frac{(VREF - VBE4)}{R6} = \frac{(VBE4 - VTEMP)}{R7} \qquad \text{[Equation. 3]}$$

The Equation. 3 can be written as an Equation. 4 on the basis of the temperature voltage VTEMP.

$$VTEMP = \left(1 + \frac{R7}{R6}\right) \times VBE4 - \left(\frac{R7}{R6} \times VREF\right) \qquad \text{[Equation. 4]}$$

As compared with the Equation. 1 relating to the temperature voltage generating unit 2A, a first term $$\text{``}\left(1 + \frac{R7}{R6}\right) \times VBE4\text{''}$$

of the Equation. 4 is substantially the same as $$\text{``}\left(1 + \frac{R2}{R1}\right) \times VBE2\text{''}$$

of the Equation. 1 but a second term $$\text{``}-\left(\frac{R7}{R6} \times VREF\right)\text{''}$$

of the Equation. 4 is different from the Equation. 1. That is, the second term $$\text{``}-\left(\frac{R7}{R6} \times VREF\right)\text{''}$$

of the Equation. 4 can lower the voltage level of the temperature voltage VTEMP with maintaining the voltage variation of the temperature voltage VTEMP according to the temperature variation.

The reference voltage generating unit 22B includes a band gap voltage output unit 221B, a current generating unit 222B, and a reference voltage output unit 226B.

The band gap voltage output unit 221B outputs the band gap voltage VBE4 which is proportional to an emitter current IE4 of the second BJT Q4 and decreases as the internal temperature increases. The current generating unit 222B generates a first current IPTAT which increases as the internal temperature increases and a second current ICTAT which decreases as the internal temperature increases. The reference voltage output unit 226B outputs the reference voltage VREF in proportion to a third current generated by summing M times of the first current (M*IPTAT) and K times of the second current (K*ICTAT), i.e., M*IPTAT+K*ICTAT, M and K being an integers.

In detail, the current generating unit 222B includes a first current generating unit 223B and a second current generating unit 224B.

The first current generating unit 223B generates the first current IPTAT by providing a third resistor R8 having a preset resistance with the band gap voltage VBE4 proportional to the emitter current IE4 of the second BJT Q4. The second current generating unit 224B forms a cascade connection with the first current generating unit 223B and generates the second current ICTAT by providing a fourth resistor R9 having a preset resistance with a base-emitter voltage VBE3 of a first BJT Q3 proportional to an emitter current IE3 of the first BJT Q3. Herein, the emitter current IE4 of the second BJT Q4 has J times of the emitter current IE3 of the first BJT Q3.

The reference voltage output unit 226B generates the reference voltage VREF by providing a fifth resistor R10 having a preset resistance with the third current (M*IPTAT+ K*ICTAT).

Figure 4:
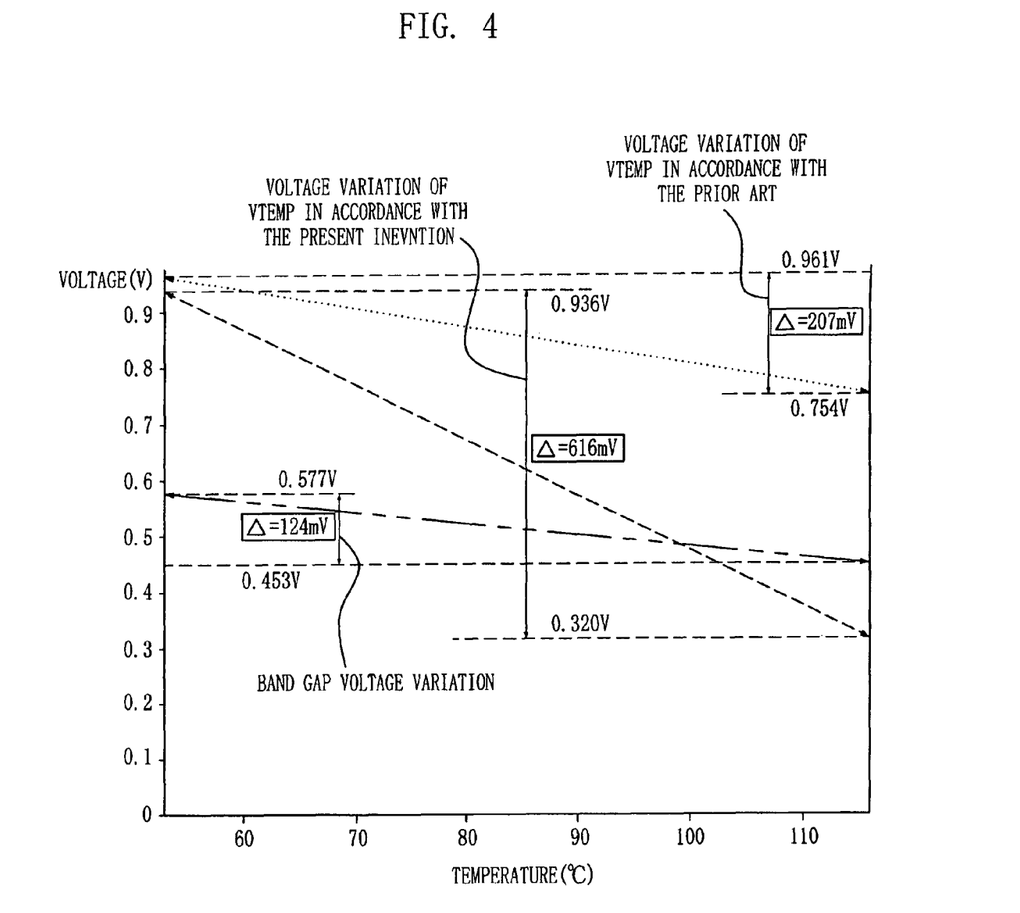
FIG. 4 is a simulation diagram illustrating a relationship between a temperature voltage generated from the temperature voltage generating unit shown in FIG. 2 and a temperature voltage generated from the temperature voltage generating unit shown in FIG. 3.

FIG. 4 is a simulation diagram illustrating a relationship between the temperature voltage VTEMP generated from the temperature voltage generating unit 2A shown in FIG. 2 and the temperature voltage VTEMP generated from the temperature voltage generating unit 2B shown in FIG. 3.

As shown, the band gap voltage varies from about 0.453 V to about 0.577 V with respect to the temperature variation 50° C.~120° C., and thus the voltage variation of the band gap voltage is about 124 mV. It is assumed that the voltage level of the reference voltage VREF is about 0.486 V according to the voltage variation of the band gap voltage.

The ratio of the second resistor R2 to the first resistor R1 (R2/R1) in accordance with the temperature voltage generating unit 2A shown in FIG. 2, and the ratio of the second resistor R7 to the first resistor R6 (R7/R6) in accordance with the temperature voltage generating unit 2B shown in FIG. 3 are adjusted. Consequently, the voltage level of the temperature voltage VTEMP does not exceed about 1.0 V on the assumption that the semiconductor memory device operates under the low power supply voltage circumstances, e.g., about 1.2 V.

In the temperature voltage generating unit 2A shown in FIG. 2, the voltage level of the temperature voltage VTEMP increases in proportion to the band gap voltage VBE2, and thus the ratio of the second resistor R2 to the first resistor R1 (R2/R1) is set to 0.66 in order to make the maximum voltage level of the temperature voltage VTEMP lower than 1.0 V. As a result, the temperature voltage VTEMP varying from about 0.754 V to about 0.961 V is generated by amplifying the band gap voltage VBE2 varying from about 0.453 V to about 0.577 V with the preset amplifying value, i.e., 1.66. That is, the voltage variation of the band gap voltage VBE2 is about 124 mV and the voltage variation of the temperature voltage VTEMP is about 207 mV generated by multiplying the voltage variation of the band gap voltage VBE2, i.e., 124 mV, by 1.66.

On the other hand, in the temperature voltage generating unit 2B shown in FIG. 3, the voltage level of the temperature voltage VTEMP increases in proportion to the band gap voltage VBE4 and decreased as much as the second term $$"-\left(\frac{R7}{R6} \times VREF\right)"$$

of the Equation. 4. The ratio of the second resistor R7 to the first resistor R6 (R7/R6) is set to 4 in order to make the maximum voltage level of the temperature voltage VTEMP lower than 1.0 V. As a result, the temperature voltage VTEMP varying from about 0.320 V to about 0.936 V is generated by amplifying the band gap voltage VBE4 varying from about 0.453 V to about 0.577 V with the preset amplifying value, i.e., 5, and decreasing the amplified value, i.e., from about 2.265 V to about 2.885 V, as much as the second term $$"-\left(\frac{R7}{R6} \times VREF\right)"$$

of the Equation. 4, i.e., −1.944. That is, the voltage variation of the band gap voltage VBE4 is about 124 mV and the voltage variation of the temperature voltage VTEMP is about 616 mV generated by multiplying the voltage variation of the band gap voltage VBE4, i.e., 124 mV, by 5.

As described above, in accordance with the preferred embodiment of the present invention, the voltage variation of the temperature voltage VTEMP is amplified with the preset amplifying value and the maximum voltage level of the temperature voltage VTEMP is amplified with a value lower than the preset amplifying value when the temperature voltage VTEMP is generated by amplifying the voltage level of the band gap voltage VBE4 varying according to the temperature variation with the preset amplifying value. Accordingly, the ODTS used in the semiconductor memory device can maintain the voltage variation of the temperature voltage VTEMP with respect to the temperature variation even if the power supply voltage of the semiconductor memory device becomes lower.

Further, in accordance with the preferred embodiment of the present invention, the ODTS used in the semiconductor memory device can maintain accuracy with respect to the measured high internal temperature though the power supply voltage of the semiconductor memory device is low.

While the present invention has been respect to the specific embodiments, it will be apparent to those skilled in the art that various changes and modifications may be made without departing from the spirit and scope of the invention as defined in the following claims.

What is claimed is:

1. An on die thermal sensor (ODTS) in a semiconductor memory device, comprising:
    a reference voltage generating unit for generating a band gap voltage and generating a reference voltage by using the band gap voltage;
    a voltage amplifying unit for receiving the reference voltage and amplifying the band gap voltage by a factor of a set amplifying value to generate the temperature voltage, wherein the temperature voltage is controlled to be lower than a set maximum voltage level and the band gap voltage is amplified based on the reference voltage; and
    a temperature information code generating unit for generating a temperature information code corresponding to a voltage level of a temperature voltage.

2. The ODTS as recited in claim 1, wherein a voltage level of the band gap voltage varies according to a temperature variation and a voltage level of the reference voltage maintains a constant value regardless of the temperature variation.

3. The ODTS as recited in claim 1, wherein the voltage amplifying unit includes:
    a reference voltage transferring unit for transferring the reference voltage;
    a feedback unit for generating a feedback voltage by dividing the temperature voltage on the basis of an output of the reference voltage transferring unit; and
    a band gap voltage amplifying unit for amplifying the band gap voltage based on the feedback voltage to output the temperature voltage.

4. The ODTS as recited in claim 3, wherein the reference voltage transferring unit includes a unit-gain buffer for amplifying the reference voltage by one-fold.

5. The ODTS as recited in claim 3, wherein the feedback unit includes first and second resistors connected in series between the temperature voltage and the output of the reference voltage transferring unit, and the feedback voltage is outputted to a common node of the first and second resistors.

6. The ODTS as recited in claim 3, wherein the band gap voltage amplifying unit includes an operational amplifier for receiving the feedback voltage as a negative input and the band gap voltage as a positive input and amplifying a difference between the inputs.

7. The ODTS as recited in claim 1, wherein the reference voltage generating unit includes:
    a band gap voltage output unit including a first bipolar junction transistor (BJT), wherein the band gap voltage output unit is configured to output the band gap voltage and the band gap voltage is proportional to a first emitter current of the first BJT and decreases as an internal temperature of the semiconductor memory device increases;

a current generating unit including a second bipolar junction transistor (BJT), wherein the current generating unit is configured to, using the band gap voltage, generate a first current increasing as the internal temperature increases and a second current decreasing as the internal temperature increases; and a reference voltage output unit for outputting the reference voltage in proportion to a third current generated by summing up the first current multiplied by M and the second current multiplied by N, wherein M and N are positive integers.

8. The ODTS as recited in claim 7, wherein the current generating unit includes:

a first current generating unit for generating the first current by providing the band gap voltage to a first resistor; and a second current generating unit forming a cascade connection with the first current generating unit, wherein the second current generating unit is configured to generate the second current by providing a second base-emitter voltage of the second BJT to a second resistor, wherein the second base-emitter voltage is proportional to a second emitter current of the second BJT, wherein the first emitter current of the first BJT is N times the second emitter current of the second BJT.

9. The ODTS as recited in claim 7, wherein the reference voltage output unit generates the reference voltage by providing the third current to a resistor.

10. The ODTS as recited in claim 7, wherein the reference voltage generating unit further includes a variation voltage generating unit for generating maximum and minimum variation voltages by adjusting the reference voltage in response to an adjusting code, thereby adjusting the temperature information code to have a code corresponding to a voltage between the maximum variation voltage and the minimum variation voltage.

11. The ODTS as recited in claim 10, wherein the temperature information code generating unit includes:

an analog-to-digital converting unit for converting the temperature voltage into a digital code having a digital value; and a code converting unit for performing a preset operation to convert the digital code into the temperature information code.

12. The ODTS as recited in claim 11, wherein the digital code is inputted to the variation voltage generating unit as the adjusting code to thereby adjust the temperature information code between the maximum variation voltage and the minimum variation voltage.

13. An on die thermal sensor (ODTS) in a semiconductor memory device, comprising:

a temperature information output unit for outputting a temperature voltage by measuring an internal temperature of the semiconductor memory device, wherein the temperature information output unit comprises:

a temperature voltage generating unit including a reference voltage generating unit for generating a band gap voltage having a voltage level varying according to a temperature variation and generating a reference voltage having a voltage level maintained at a constant value regardless of the temperature variation; and a voltage amplifying unit for receiving the reference voltage and amplifying the band gap voltage by a factor of a set amplifying value to generate the temperature voltage, wherein the temperature voltage is controlled to be lower than a set maximum voltage level and the band gap voltage is amplified based on the reference voltage; and a temperature information code generating unit for generating a temperature information code corresponding to a voltage level of the temperature voltage.

14. The ODTS as recited in claim 13, further comprising an operation controller, wherein the temperature information code generating unit comprises:

an analog-to-digital converting unit for converting the temperature voltage into a digital code having a digital value; and a code converting unit for performing a preset operation to convert the digital code into the temperature information code;

wherein the operation controller is configured to generate operating control signals and a test mode signal to control the temperature voltage generating unit, the analog-to-digital converting unit and the code converting unit.

15. The ODTS as recited in claim 13, wherein the voltage amplifying unit includes:

a reference voltage transferring unit for transferring the reference voltage;

a feedback unit for generating a feedback voltage by dividing the temperature voltage on the basis of an output of the reference voltage transferring unit; and a band gap voltage amplifying unit for amplifying the band gap voltage based on the feedback voltage to output the temperature voltage.

16. The ODTS as recited in claim 15, wherein the reference voltage transferring unit includes a unit-gain buffer for amplifying the reference voltage by one-fold.

17. The ODTS as recited in claim 15, wherein the feedback unit includes first and second resistors connected in series between the temperature voltage and the output of the reference voltage transferring unit, and the feedback voltage is outputted to a common node of the first and second resistors.

18. The ODTS as recited in claim 15, wherein the band gap voltage amplifying unit includes an operational amplifier for receiving the feedback voltage as a negative input and the band gap voltage as a positive input to amplify a difference between the inputs.

19. The ODTS as recited in claim 13, wherein the reference voltage generating unit includes:

a band gap voltage output unit including a first bipolar junction transistor (BJT), wherein the band gap voltage output unit is configured to output the band gap voltage and the band gap voltage is proportional to a first emitter current of the BJT and decreases as an internal temperature of the semiconductor memory device increases;

a current generating unit including a second BJT, wherein the current generating unit is configured to generate a first current increasing as the internal temperature increases and a second current decreasing as the internal temperature increases; and a reference voltage output unit for outputting the reference voltage in proportion to a third current generated by summing up the first current multiplied by M and the second current, multiplied by N, wherein M and N are positive integers.

20. The ODTS as recited in claim 19, wherein the current generating unit includes:

a first current generating unit for generating the first current by providing the bandgap voltage to a first resistor; and a second current generating unit forming a cascade connection with the first current, wherein the second current generating unit is configured to generate the second current by providing a second base-emitter voltage of the second BJT to a second resistor, wherein the second base-emitter voltage is proportional to a second emitter current of the second BJT, wherein the first emitter current of the first BJT is N times of the second emitter current of the second BJT.

21. The ODTS as recited in claim 19, wherein the reference voltage output unit generates the reference voltage by the third current to a resistor.

* * * * *